N. HOLMAN.
APPARATUS FOR COOKING AND COOLING SYRUPS FOR CANDY.
APPLICATION FILED APR. 13, 1912.
1,082,268.
Patented Dec. 23, 1913.
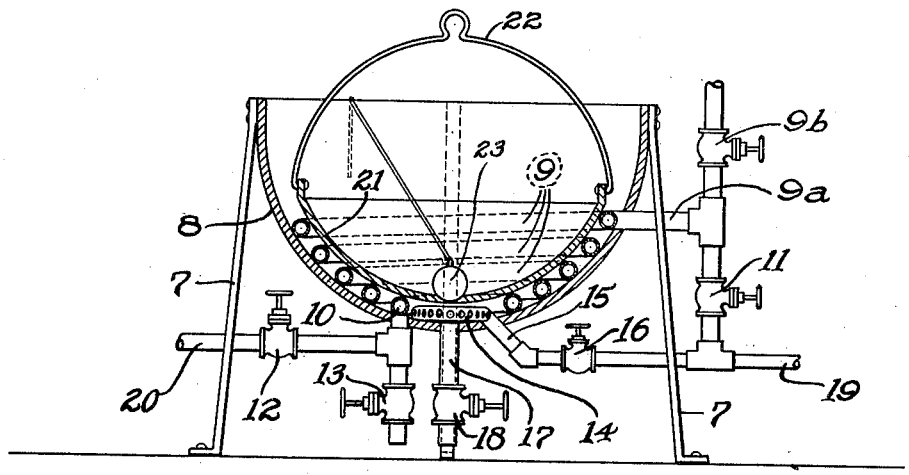

UNITED STATES PATENT OFFICE.

NICHOLAS HOLMAN, OF CHICAGO, ILLINOIS.

APPARATUS FOR COOKING AND COOLING SYRUPS FOR CANDY.

1,082,268.  Specification of Letters Patent.  Patented Dec. 23, 1913.

Application filed April 13, 1912. Serial No. 690,485.

*To all whom it may concern:*

Be it known that I, NICHOLAS HOLMAN, a citizen of the United States, and resident at Chicago, in the county of Cook and State of Illinois, have invented a new and useful Improvement in Apparatus for Cooking and Cooling Syrups for Candy.

The object of my invention is to provide improved means for cooking crystallizing and other syrups and to reduce the temperature of the cooked syrup rapidly and uniformly in the cooking kettle.

The manner in which I accomplish my object is described in the following specification and illustrated in the accompanying drawings in which the figure represents a central vertical sectional view of the apparatus.

In the drawing 7 indicates a supporting frame in which a kettle 8 is fixed. Within this kettle is a spiral coil of pipe 9 adapted to be used for the passage therethrough of steam and water. This coil is spaced from the kettle to thereby provide a clear space between the coil and kettle for the flow of syrup and for cleaning purposes. Coupled to this coil and extending through the kettle are pipes 9ª and 10. Connected with these pipes are valves 11, 12, 13 and 9ᵇ the purpose of which is hereinafter described. Centrally located at the bottom of the kettle and below the coil 9 is a hollow ring 14. This ring is perforated so as to project jets of steam between the inside of the kettle and the coil 9, and project other jets upward, and into the center of the kettle. Connected to this ring is a pipe 15 provided with a valve 16. Fixed in the bottom of the kettle below the ring 14 is an outlet pipe 17 provided with a valve 18. Steam is admitted through the valves 11 and 16 from the inlet pipe 19, and is emitted from the coil 9 through the exhaust valve 13. Water is admitted to the coil 9 through the valve 12 from the inlet pipe 20, and is emitted through the outlet valve 9ᵇ. Suspendable over the kettle 8 is a bowl 21 provided with a bail 22. In the bottom of this bowl is an automatic valve 23, provided with a chain 23′. This bowl is adapted to be lowered into the kettle and to rest on the coil 9. Any suitable means can be adapted for the purpose of suspending, raising, and lowering the bowl in the kettle.

When the cooking apparatus is constructed as descibed and illustrated and connected with a steam and water supply its use and operation is as follows: Sufficient water is placed in the kettle to cover the coil 9. The valve 16 is then opened and steam admitted through the ring 14. The desired quantity of sugar is then added to the water. This sugar is dissolved in the water by the divergent jets of steam from the ring 14. The valve 16 is then closed and the valve 11 opened and steam admitted into the coil 9, through which it passes to the exhaust valve 13 by this means the contents of the kettle is cooked to the degree desired. The valves 11 and 13 are then closed and steam thereby shut off. The bowl 21 is then lowered into the kettle. As the bowl sinks in the syrup the valve 23 is lifted and the syrup thereby enters the bowl. When the bowl rests on the coil and the syrup in the bowl and kettle are at the same level the valve 23 closes. The water is then turned on through the valve 12 and flows through the coil 9 and valve 9ᵇ whereby the syrup between the bowl and kettle is quickly and uniformly cooled. The valve 18 is then opened and the cooled syrup allowed to flow through conducting pipes to be suitably distributed. The valve 18 is then closed and the valve 23 opened by means of the chain and the contents allowed to flow from the bowl arround the coil and when cooled is drawn through the valve 18. This is repeated until the contents of the bowl and kettle has been cooled and drawn off.

What I claim is:—

1. A cooking device of the kind described, consisting of a kettle adapted to contain liquids and solids to be cooked, means adapted to project jets of steam into the contents of said kettle whereby said contents is amalgamated, means in said kettle adapted for the passage of steam whereby the amalgamated contents is heated and cooked, means for substituting water for steam whereby the contents of said kettle is cooled, a vessel insertible in said kettle, said vessel having an aperture in the bottom and means for opening and closing said aperture whereby part of the contents of said kettle is admitted to and from said vessel whereby said contents is uniformly and rapidly cooled, and means for drawing the cooled contents from said kettle, as described.

2. A cooking apparatus, including a kettle adapted to contai nthe substance to be cooked, a coiled pipe arranged in said kettle adjacent the bottom thereof, means for introducing steam in said pipe for cooking the substance in the kettle, and means for introducing water in said pipe for cooling the substance; and a vessel insertible in said kettle, said vessel having an aperture in its bottom and means for opening and closing the opening, whereby part of the contents of said kettle is admitted to and from said vessel whereby the said contents is uniformly and rapidly cooled, and means for drawing the cooled contents from said kettle.

NICHOLAS HOLMAN.

Witnesses:
 THOMAS J. MORGAN,
 GUSTAVE T. FRAENCKEL.

Copies of this patent may be obtained for five cents each, by addressing the "Commissioner of Patents, Washington, D. C."